May 15, 1962 A. J. GALE 3,035,221
MULTIPLE-UNIT ELECTROSTATIC GENERATORS
Filed July 27, 1959 2 Sheets-Sheet 1

United States Patent Office 3,035,221
Patented May 15, 1962

3,035,221
MULTIPLE-UNIT ELECTROSTATIC GENERATORS
Alfred J. Gale, Lexington, Mass., assignor to High Voltage Engineering Corporation, Burlington, Mass., a corporation of Massachusetts
Filed July 27, 1959, Ser. No. 829,569
4 Claims. (Cl. 322—2)

This invention relates to the generation of voltage by electrostatic means and in particular to the generation of voltage by a cascade connection of electrostatic generators of the type disclosed and claimed in my co-pending application, Serial No. 713,050. More particularly stated, my invention comprehends specific charge-transfer circuitry for use in such cascaded electrostatic generators.

The invention may best be understood from the following detailed description thereof having reference to the accompanying drawing in which.

Figure 1:
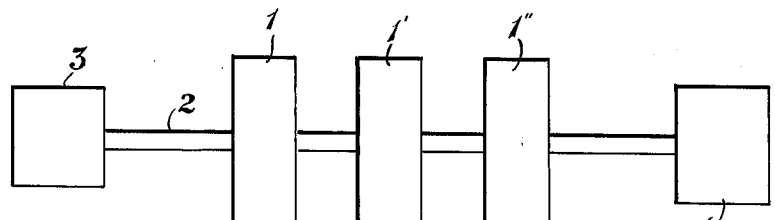
FIG. 1 is a diagram indicating the physical form of one embodiment of the invention.

Referring to the drawings and first to FIG. 1 thereof, a series of electrostatic generators 1, 1', 1", which may be of the type disclosed and claimed in my aforementioned co-pending application, are arranged on a common shaft 2 which is driven at one end by a drive motor 3 and which may include an alternator 4 at the opposite extremity thereof for the purpose of providing the necessary electrical power for the operation of ion sources and other devices at the high-voltage-terminal end of the machine. Each generator 1, 1', 1" operates on principles such as those disclosed in my aforementioned co-pending application and may be connected either in parallel or in series depending upon whether a high-voltage output or a low-voltage high-current output is desired. In the apparatus shown in the drawings the device is intended to operate as a high voltage apparatus and therefore the generators are connected in series.

Figure 2:
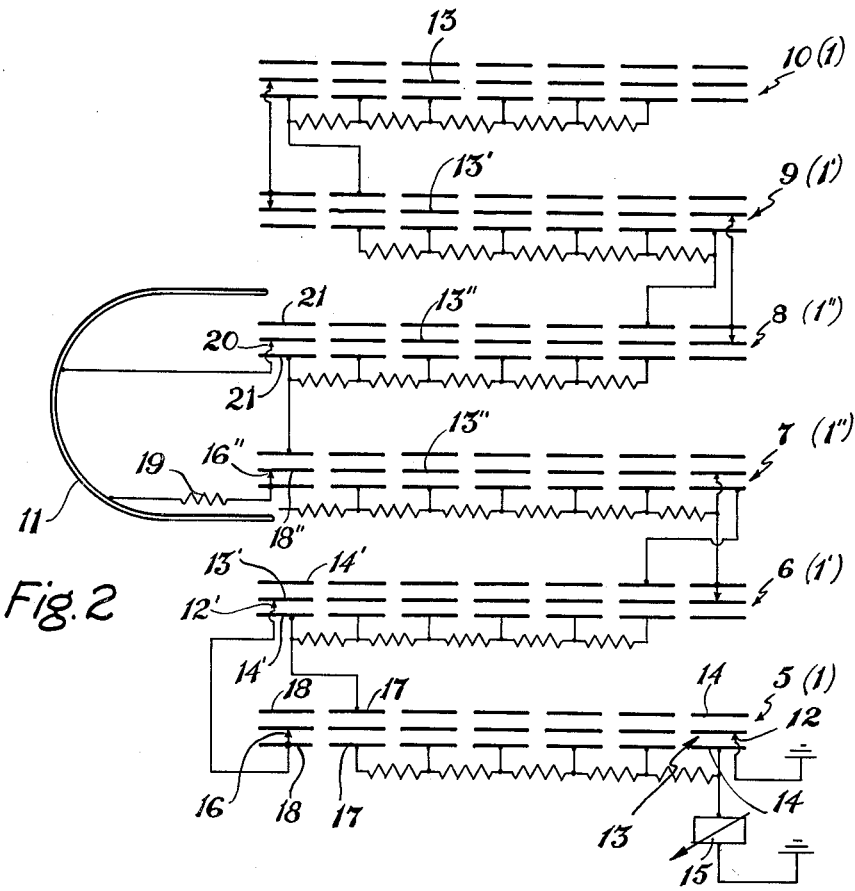
FIG. 2 is a circuit diagram of the apparatus in FIG. 1.

Referring now to FIG. 2, it will be noted that in the circuit diagram thereof it has not been possible to preserve accurately the physical configuration shown in FIG. 1. Although there are six tiers 5–10 of generator units shown in FIG. 2, the bottom three 5–7 represent the up-charge system while the top three units 8–10 represent the down-charge system. That is to say, each generator unit 1, 1', 1" consists roughly speaking of a rotor within a stator. Each rotor comprises essentially a plurality of conductive elements adapted to rotate about an axis, and each stator comprises essentially a plurality of stationary or counter-rotating conductive elements which enclose each rotor element in succession. Each stator element acts as a Faraday cage and shields its interior from external electric fields, so that any rotor element enclosed thereby assumes a potential equal to that of the stator element enhanced by that due to its own charge. As the rotor rotates, half of it is travelling from the lower-voltage end of its generator unit towards the higher voltage end; and the other half is travelling from the higher voltage end back to the lower-voltage end. The circuit elements are so arranged that as each point on a rotor travels from the lower-voltage end to the higher-voltage end, it carries electric charge of that polarity which it is desired to establish on the high voltage terminal 11, and as each such point travels from the higher voltage end to the lower-voltage end, it carries charge of opposite polarity.

As is apparent from FIG. 2, at the grounded end of the entire device there is a brush 12 connected to ground which touches the rotor 13 as it goes by. At the time the rotor 13 touches the grounded brush 12, it is passing between two stator elements 14 upon which a voltage is maintained by a voltage source 15 of polarity opposite that which is to be deposited on the high voltage terminal 11, thereby inducing charge of proper polarity on the rotor 13. As each element of the rotor 13 passes by a brush 16 at the opposite end of the first unit, it touches this brush 16 which therefore puts it in electrical contact with the lower voltage end of the rotor 13' of the second unit. At the time the rotor 13' of the second unit passes by the brush 12', it is between two stator elements 14' which are connected to that pair of stator elements 17 of the first generator unit which has the next to highest voltage. Since the rotor 13' second generator unit is in contact not only with the charged rotor 13 of the first generator unit, but also with the stator elements 18 at highest potential of the first generator unit, the electric charge on the rotor 13 of the first generator unit will leak off onto the rotor 13' of the second generator unit. A similar connection transfers this same charge to the rotor 13" of the third generator unit.

Within the high voltage terminal 11 electric charge is removed from the rotor 13" of the third generator unit by a brush 16" which is connected to the top stator elements 18". As this charge leaks off it travels through a resistance 19 which insures that the top or high voltage stator elements 18" of the third generator unit are always at a potential which is higher than that of the high voltage terminal 11. On the down charge side of the third generator unit, the rotor 13" of that unit passes by a brush 20 which is directly connected to the high voltage terminal 11. At this point the rotor 13" is passing between two stator elements 21 which are connected to the high voltage stator element 18" of the up-charge side of the third generator unit. As a result, electric charge of polarity opposite to that of the high voltage terminal 11 is induced onto the rotor 13" of the third generator element and this charge is carried down to the rotor 13' of the second generator unit in a manner similar to that employed for charge transfer on the up-run side of the units. The charge is then transferred to the rotor 13 of the first generator unit in a similar manner and thence to ground.

Figure 3:
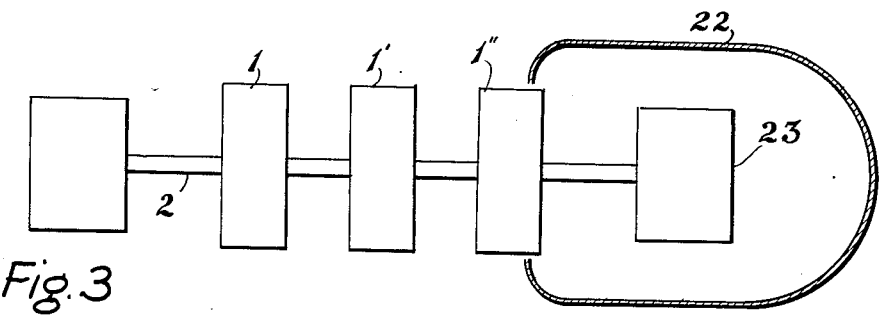
FIG. 3 is a diagram illustrating the physical form of a second embodiment of the invention.
Figure 4:
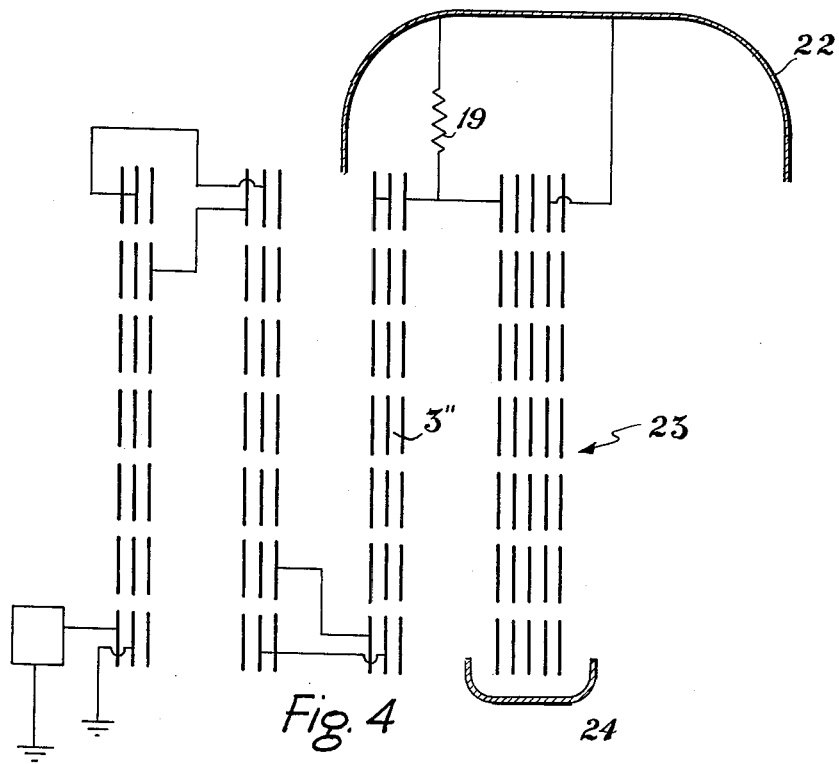
FIG. 4 is a circuit diagram of the apparatus of FIG. 3.

Referring now to FIGS. 3 and 4, therein is shown a voltage generator of a type suitable for use in compact devices such as a compact neutron source of the general type disclosed and claimed in my co-pending application, Serial No. 515,435. In FIG. 4 only the up-run circuitry is shown since it is apparent from FIG. 2 that the down-run circuitry is more or less a mirror image of the up run circuitry. In the device shown in FIGS. 3 and 4, the high voltage terminal 22 is raised to and maintained at high voltage in a manner virtually identical to that of the apparatus shown in FIGS. 1 and 2. However, the alternator 4 of FIG. 1 has been replaced by a fourth generator unit 23 which is adapted to operate at relatively low voltage but high current. Thus, for example, an ion source (not shown) can be energized by the high-current generator unit 23 while ion-accelerating voltage can be generated by the rest of the generator units 1, 1', 1". As has been previously described, the charge which is brought within the high voltage terminal 22 by the rotor 13" of the third generator unit 1" is permitted to leak off to the high voltage terminal 22 through a resistance 19. At the same time, electric charge is also transferred between the high voltage terminal 22 and an auxiliary terminal 24 within the high voltage terminal 22 by means of the high current generator unit 23. The high current generator unit 23 is, of course, rotated by the same shaft 2 that drives the other generator units 1, 1', 1" and its voltage may correspond, for example, to the same voltage as is produced across each of the other generator units. However, higher current may be produced by this generator unit 23 by employing more rotors and stators in the structure than in the other generator units, as is explained in detail in my aforementioned co-pending application, Serial No. 713,050. As will be apparent from a reading of my aforementioned copending application, Serial No. 515,435, it is necessary under certain circumstances that the auxiliary generator provide more current than that provided by the main voltage generator, since the current in the ion source generally exceeds that in the accelerated ion beam.

Having thus described the principles of the invention together with illustrative embodiments thereof, it is to be understood that although specific terms are employed, they are used in a generic and descriptive sense and not for purposes of limitation, the scope of the invention being set forth in the following claims.

I claim:

1. Interconnectors for cascaded generator units, each unit comprising a low-voltage Faraday cage, a high-voltage Faraday cage, a plurality of Faraday cages at intermedite potentials therebetween, and a rotor adapted to traverse the interior of said Faraday cages in sequence, said interconnectors comprising in combination: means for transferring electric charge between the rotor of a first generator unit within its high voltage Faraday cage and the rotor of a second generator unit within its low-voltage Faraday cage, a connector between said low-voltage Faraday cage and a Faraday cage of the first generator unit which closely precedes said high-voltage Faraday cage in the sequence traversed by said rotor of said first generator unit.

2. Interconnectors for cascaded generator units, each unit comprising a low-voltage Faraday cage, a high-voltage Faraday cage, a plurality of Faraday cages at intermediate potentials therebetween, and a rotor adapted to traverse the interior of said Faraday cages in sequence, said interconnectors comprising in combination: means for transferring electric charge between the rotor of a first generator unit within its high voltage Faraday cage and the rotor of a second generator unit within its low-voltage Faraday cage, a connector between said low-voltage Faraday cage and a Faraday cage of the first generator unit which closely precedes said high-voltage Faraday cage in the sequence traversed by said rotor of said first generator unit, and a shaft upon which the rotor of all of said units are mounted.

3. A D.C. generator comprising in combination: a plurality of cascaded generator units, each unit comprising a low-voltage Faraday cage, a plurality of Faraday cages at intermediate potentials therebetween, and a rotor adapted to traverse the interior of said Faraday cages in sequence: interconnectors between said units comprising in combination: means for transferring electric charge between the rotor of a first generator unit within its high voltage Faraday cage and the rotor of a second generator unit within its low-voltage Faraday cage, and a connector between said low-voltage Faraday cage and a Faraday cage of the first generator unit which closely precedes said high-voltage Faraday cage in the sequence traversed by said rotor of said first generator unit; an additional generator unit within the high-voltage Faraday cage of the last of said cascaded units, a charge collector adapted to collect charge from the rotor of said last cascaded unit within its high-voltage Faraday cage, a resistance between said collector and said high-voltage Faraday cage of said last cascaded unit, a connector between said collector and the low-voltage Faraday cage of said additional unit, and means for transferring electric charge between the high-voltage Faraday cage of said last cascaded unit and the rotor of said additional unit within its low-voltage Faraday cage.

4. A D.C. generator comprising in combination: a plurality of cascaded generator units, each unit comprising a low-voltage Faraday cage, a high-voltage Faraday cage, a plurality of Faraday cages at intermediate potentials therebetween, and a rotor adapted to traverse the interior of said Faraday cages in sequence: interconnectors between said units comprising in combination: means for transferring electric charge between the rotor of a first generator unit within its high voltage Faraday cage, and the rotor of a second generator unit within its low-voltage Faraday cage, and a connector between said low-voltage Faraday cage and a Faraday cage of the first generator unit which closely precedes said high-voltage Faraday cage in the sequence traversed by said rotor of said first generator unit; an additional generator unit within the high-voltage Faraday cage of the last of said cascaded units, a charge collector adapted to collect charge from the rotor of said last cascaded unit within its high-voltage Faraday cage, a resistance between said collector and said high-voltage Faraday cage of said last cascaded units, a charge collector adapted to collect charge from the rotor of said last cascaded unit within its high-voltage Faraday cage, a resistance between said collector and said high-voltage Faraday cage of said last cascaded unit, a connector between said collector and the low-voltage Faraday cage of said additional unit, means for transferring electric charge between the high-voltage Faraday cage of said last cascaded unit and the rotor of said additional unit within its low-voltage Faraday cage, and a shaft upon which the rotors of all of said units are mounted.

References Cited in the file of this patent

UNITED STATES PATENTS 2,675,516   Felici _____ Apr. 13, 1954